United States Patent [19]

Dougan

[11] 4,416,220

[45] Nov. 22, 1983

[54] AUTOMATIC HOG FEEDING SYSTEM

[76] Inventor: Larry Dougan, Rte. 1, Iowa Falls, Iowa 50126

[21] Appl. No.: 354,309

[22] Filed: Mar. 2, 1982

[51] Int. Cl.³ ............................................. A01K 5/02
[52] U.S. Cl. ............................ 119/51.11; 119/52 AF; 119/53
[58] Field of Search ........... 119/52 AF, 51.11, 51 CF, 119/53

[56] References Cited

U.S. PATENT DOCUMENTS

| | | | |
|---|---|---|---|
| 2,782,761 | 2/1957 | Martin et al. | 119/52 AF |
| 2,918,037 | 12/1959 | Polley | 119/52 AF |
| 3,025,832 | 3/1962 | Witzenburg | 119/52 AF |

FOREIGN PATENT DOCUMENTS 935818 11/1955 Fed. Rep. of Germany ... 119/51 CF

Primary Examiner—Hugh R. Chamblee
Attorney, Agent, or Firm—James F. Cottone

[57] ABSTRACT

An automatic animal feeding system having a vertically adjustable inverted U-shaped cover disposed over a feed trough. Vertical adjustment of the cover provides for an advantageously settable feed discharge gap into the feed trough. The system comprises an automatically energized driving chain movable along the feed trough, which chain carries feed propelling paddles. The feeding apparatus is especially adapted for use in the feeding of wet ground corn to hogs, and provides substantially reduced probabilities of jamming due to feed build up, or of causing feed spoilage due to unwanted accumulation of feed in inaccessible areas.

9 Claims, 6 Drawing Figures

U.S. Patent  Nov. 22, 1983  4,416,220
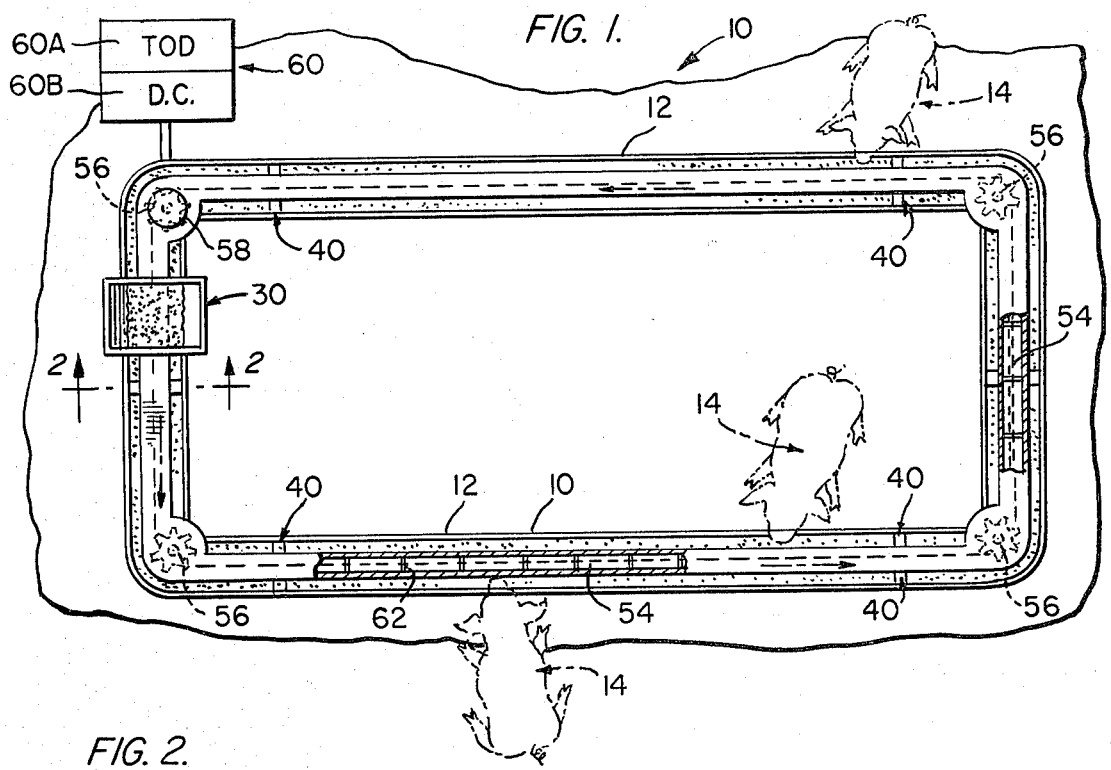
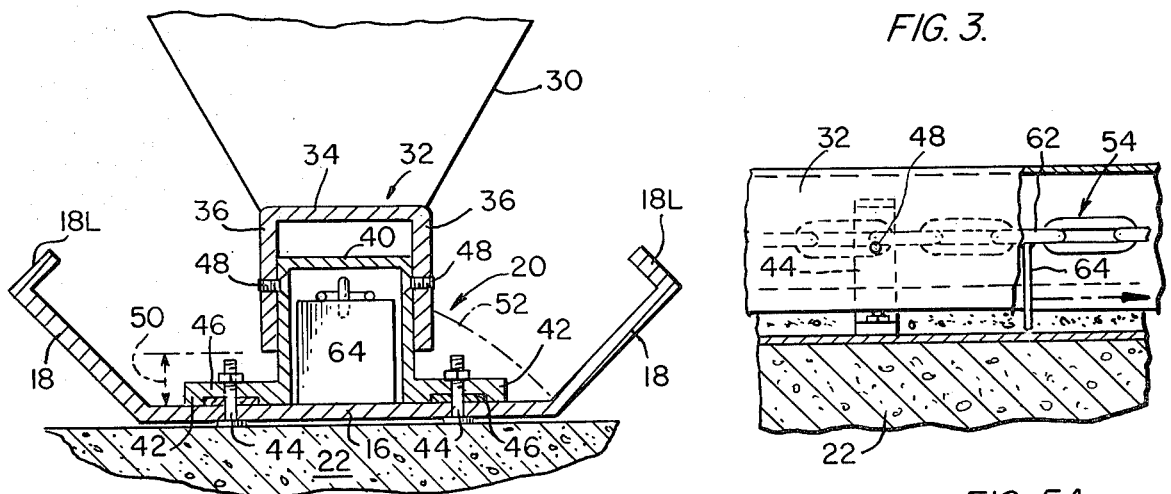
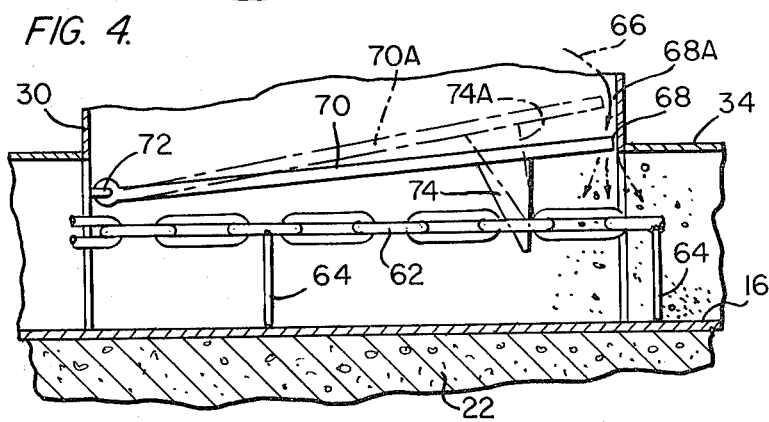
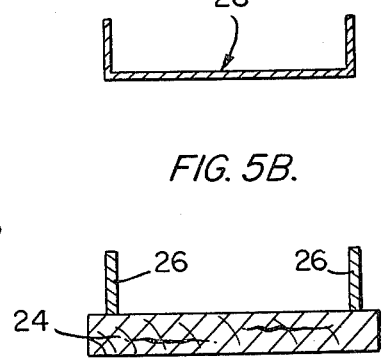

AUTOMATIC HOG FEEDING SYSTEM

BACKGROUND OF THE INVENTION

1. Field of the Invention

The present invention relates generally to an automatic system for use in the feeding of farm animals, and more specifically to a structure adapted for controllable feeding of wet, ground corn and the like. Specifically, the invention relates to an automatically controlled, chain driven mechanism for optimally distributing in time and location, feedstuffs of a wide range to hogs, the apparatus having adjustable means for optimally releasing the feed into the feeding area.

2. Description of the Prior Art

Heretofore, numerous types of apparatus and systems have been used for the unattended feeding of farm animals. With particular reference to hog feeders, however, provision must be made to minimize possible damage of the feeding structure by the hogs, and possible injury to the hogs themselves. The prior art devices have had inherent drawbacks in the feeding of wet feed material such as wet, ground corn, since this material has a tendency to jam up in the feeding apparatus and otherwise causes dissemination problems of trough distribution of the feed.

Wet feed of the nature referred to has a tendency to spoil within a rather short period of time, by molding or the like, and therefore it is not desirable to maintain substantial quantities in storage. Care must also be taken to insure that the material is controllably fed into a feed trough in a manner to prevent jamming-up of the feed, damage to the mechanism and, at the same time, insure that the feed will be readily accessible to a hog and that feed introduced into the feed trough will be timely and substantially completely eaten over a controlled period of time.

Numerous different types of animal feed apparatus and systems have been used over the years, but none have proven entirely satisfactory. Actually, the existing patent and published material concerning apparatus for feeding of hogs is somewhat limited. One prior art apparatus specifically pertaining to automatic feeding of hogs is disclosed in U.S. Pat. No. 3,025,832 to Witzenburg. Basically, this patent utilizes an auger mechanism to advance the feed from a supply hopper along a single, straight line feed trough. In this apparatus, the auger is spaced approximately four inches off the bottom of the feed trough and two inches in from the side. This permits feed to get packed in, and prevents its availability to the hogs. In order to overcome this problem, and as used in other known prior art devices, agitation means must be provided in the feed carrying areas, operable either by the feeding hogs, or by mechanical agitation means. There are other types of hog feeders currently in use, but the ones known to the present applicant all include at least one form of agitation and, in some certain instances, a plurality of agitation means.

Similarly configured feeding devices are also known for use with farm animals other than hogs. Generally speaking, however, these feeders for other animals are not presented with the same problems as hog feeders, these latter feeders being subject to substantial damage by hogs in use, and normally requiring extremely heavy and braced structures.

Among the other known types of related feeders, an automatic poultry feeder is disclosed in a publication by the Pennsylvania State School of Agriculture, "Penn State Automatic Poultry Feeder", A. S. Mowery, et al., Progress Report No. 17, October, 1949. This discloses an automatic poultry feeder laid out in the form of an open rectangle and using chain-carried paddles, referred to therein as flights (to provide feed to the chickens). The report also suggests the use of automatic timing mechanisms to periodically energize the feeder mechanisms, and the construction utilizes a U-shaped feeding trough and chain-driven distributing paddles.

U.S. Pat. No. 3,319,607 to Lovercheck and U.S. Pat. No. 2,652,808 to Wagner both disclose the use of chain-driven paddle-like structures to distribute feed to animals. The paddles of both Lovercheck and Wagner scrape along the bottom of the trough to advance the feed. In each of these patents, however, the chains used are not maintained completely from the feed path, nor are they completely protected by a cover element.

Other apparatus used for related continuous animal feeding mechanisms have utilized chain devices to move feed along conveyors, and timing means are also known. Examples of these techniques are found in patents to Dodge, U.S. Pat. No. 365,171; Emrich, U.S. Pat. No. 3,058,571; and Ripstein, U.S. Pat. No. 3,786,783.

Prior to the present invention, however, there has not been an entirely satisfactory hog feeding mechanism which incorporates a jam-free distributing mechanism, has a properly controllable discharge of problem-prone feeds into a feeding trough, and which is cost effective and robust enough for use with farm animals such as hogs.

SUMMARY OF THE INVENTION

It is therefore a primary object of the present invention to provide improved apparatus for feeding farm animals in general, and for feeding hogs in particular.

Another object of the present invention is to provide improved apparatus for feeding particular types of problem-prone feedstuffs, such as wet corn, to hogs.

The present automatic animal feeder utilizes a periodically energized chain-driven mechanism to distribute feed along a trough by means of a number of paddles attached to the drive chain at spaced intervals. The feed trough is of generally U-shaped configuration. The drive chain is positioned above the trough from which the animals feed directly, and the paddles reach down from a small, inverted U-shaped cover into the trough bottom to distribute the feed. The drive chain and paddles are mounted such that the chain is kept well above and out of the feed. The inverted U-shaped cover serves a dual function of physically protecting the feed drive chain from the elements and from the feeding animals, and adjustably metering the feed into the feed trough.

A preferred embodiment of the automatic feed system incorporates a generally oval or rectangular shaped trough and the animals can feed from either the inside area or outside area of the overall apparatus. A feed hopper for supplying feed to the system is used. The system also incorporates automatic, dual clock mechanisms to operate the chain drive motor at predetermined times of the day for predetermined duty cycles. It is especially noteworthy that the arrangement of parts and their functions are such that specific agitation means for the feed are unnecessary. Previously known agitators have been either mechanically operated or, under some circumstances, were operable by the hogs pushing against portions with their noses to work the feed out.

The aspect of using the paddles to push the feed under an adjustably positionable cover member is of significance, the arrangement being such that wet corn can be fed, as distinguished from many prior known devices which either preclude use of wet feed, or are subject to jam-ups, or the like.

Additionally, the present apparatus has the virtue of simplicity in construction, and is significantly less expensive to initially build and maintain. This is especially advantageous in light of the inherent safeguards against damage to the structure by feeding hogs.

BRIEF DESCRIPTION OF THE DRAWINGS

Additional objects and advantages of the invention will become apparent to those skilled in the art as the description proceeds with reference to the accompanying drawings wherein:

FIG. 1 is a top plan view of the system of the present invention, parts being broken away for clarity, and schematically depicting hogs feeding from the apparatus;

FIG. 2 is a fragmentary, enlarged view taken on line 2—2 of FIG. 1;

FIG. 3 is a view taken on line 3—3 of FIG. 2, showing in detail the construction of the food conveying chain and suspended paddles thereon;

FIG. 4 is a fragmentary, enlarged view taken on line 4—4 of FIG. 2, disclosing details of a feed hopper outlet closure and means for periodically displacing the cover to permit feed to fall from the hopper to the feed trough; and FIGS. 5A and 5B schematically depict additional constructional forms of a feed trough which can be used in lieu of the trough shown in cross-section in FIG. 2.

DETAILED DESCRIPTION OF PREFERRED EMBODIMENTS

It is desirable at this point to re-emphasize the advantages and significant features wherein the present invention differentiates over the prior art, and for which reasons the present invention obviously constitutes significant improvements over known prior hog feeding apparatus.

As known in the art, feed used for hog feeding can have the same consistency or particle size as flour, and frequently agitation is required in the bottom of a hopper in order to feed the same thereinto. Particularly when using feed of this type which has a high moisture content, or feed with water added, there is a good possibility of a jam-up of the feed in the conveyor. Additionally, it has been found that these conditions lead to a tendency to waste feed. The apparatus of the present invention contemplates in large measure, use with feed consisting of ground corn with or without mineral additives. One form of feed usable with the apparatus of the present invention consists of cornmeal and soy bean supplements in the neighborhood of, for example, 80%. The feed can be treated to reduce moisture content because wet corn can consist of up to about 30% moisture. A dry corn feed or a combined feed having about 13% moisture can readily be utilized. The reduction in moisture content can constitute, especially in combinations or use of corn with supplements, a substantial cost savings of approximately $0.20 per bushel.

Other cost savings accrue due to the simplicity of construction of the present invention, and the very dramatic reduction in maintenance required. Utilizing the present hog feeder, it has been found that a saving in cost of a substantial amount for installation is present and, due to minimization of waste of feed, there is a further cost savings. The present device also permits feeding of high moisture feed and feed with water added. In other types of feeders currently in use, this has not been possible.

It has also been found that better feed efficiency is obtained by feeding hogs in two three-hour periods each day. During the three hour feeding period, an additional automatic timer energizes the chain drive mechanism for approximately two minutes out of every five minutes. The 2/5 minute duty cycle is adjustable depending on particular feeding conditions encountered. These two duty cycles both assure good utilization of feed, and greatly reduce the jamming/spoiling probabilities.

Referring now to FIGS. 1–4, there is shown a preferred embodiment of an automatic hog feeding system according to the present invention, generally designated 10. In the overall configuration shown in FIG. 1, a feed trough 12 is of generally rectangular configuration and animals, primarily hogs, are shown in broken lines at 14, feeding from opposite sides of the feed trough 12.

The feed trough 12 can have different cross-sectional configurations but preferably, as shown in FIG. 2, has a base portion 16 and upstanding right and left outer edges 18, which are disposed at an angle from the horizontal. The outer edges 18 carry a small lip portion 18L disposed at right angles to the edges 18 to prevent feed from being raked out of the trough. As shown at the right-hand of FIG. 2, the trough configuration forms an easily accessible eating or feeding area at 20. The base 16 can be mounted directly to a floor 22 of an establishment or the entire feed trough may be anchored on blocks of wood (illustratively 4"×4s", not shown) spaced approximately every ten feet along the trough. This elevated arrangement prevents the entry of animal droppings into the feed trough 12. Alternately, as shown in FIG. 5B, the feed trough may consist of a base board 24 of appropriate dimensions such as, a ten inch base board, which can either be part of a floor structure, or can be laid thereon in a desired pattern. Mounted atop the base board 24 are upstanding side edges 26, which are shown as substantially vertical. Yet another type of trough is shown in FIG. 5A, wherein a feed trough, 28 is formed in an open top, rectangular configuration. The preferred trough configuration, however, is that shown in FIGS. 1–4, inclusive.

The feeding system 10 further includes a feed hopper 30, adapted to introduce feed at a selected position into the feed trough 12. As will be discussed hereinbelow, there are certain significant operational features incorporated in the hopper 30.

Adjustably positioned and mounted within the general confines of the feed trough 12, and co-extensive therewith, is a cover member 32, the function of this cover being a significant feature of the present invention. The cover 32 is generally U-shaped in cross-section and includes a top member 34, two side members 36, and an open bottom, not designated. The cover 32 is best seen FIG. 2, and is shown in its normal position as resembling a inverted "U". A plurality of mounting brackets 40 are positioned along the length of feed trough 12, to secure the feed distributing means to the trough. The positioning of the brackets 40 along the feed trough 12 is best seen in FIG. 1, where for simplicity of exposition, only a few brackets 40 are shown. In a particular preferred embodiment, the brackets 40 are placed approximately every few feet along the trough to support the weight of the associated apparatus, as well as that of an occassional transiting hog. As seen in FIG. 2, the bracket 40 is generally inverted U-shaped in cross-section and further has a left and right feet portions 42. A bolt hole (undesignated) is located in each of the feet 42 and a pair of threaded bolts 44 are used to bolt each of the feet 42 to the base portion 16 via corresponding bolt holes (undesignated) therein. A thin spacing washer 46 is placed between the bottom of each foot 42 and the top of the base 16. (The washers 46 of FIG. 2 are shown very exaggerated in thickness for clarity). A pair of bolt holes (undesignated) are located in the side members 36 of the cover 32, and corresponding holes (undesignated) are located in the upper portions of the bracket 40. Through these matching bolt holes, a pair of threaded bolts 40 fasten the two members together such that the lower extremity of the sides 36 are vertically displaced from the upper surface of the base 16 by a distance 50, hereinafter called the gap 50.

It has been found that the gap 50 thus formed can be made of variable height to advantageously correspond to the type of feed in use, as well as to the remainder of the feeding conditions. This gap height variation may be accomplished via the simple expedient of inserting additional washers of appropriate thickness to those depicted as 46, and refastening the bolts 44. When using a so-called wet feed, such as wet ground corn, a gap at 50 height of $\frac{1}{4}$ inch has been found suitable. This height is adequate to permit feed to pass thereunder, or therethrough, into the feed trough 12 to a level substantially as indicated at 52.

In order to distribute the feed to the different reaches of the feed trough 12, a motor driven chain drive mechanism is used. This preferably consists of a drive chain 54 of a known logging type, which is extremely tough and sturdy in construction, and which is operatively passed around a plurality of toothed cogged wheels 56. One of the cog wheels 56 is operatively connected to a drive motor 58, for driving of the drive chain 54. An automatic timing mechanism 60 is operatively connected to the drive motor 58 for periodically introducing feed into the feed trough 12, as described above, to obtain efficient utilization of the feed. Attached to spaced ones of links 62 of the drive chain 54, by welding or the like, are feed paddles 64, shown in front elevation in FIG. 2 and side elevation in FIG. 3.

In operation, feed, as shown at 66 in hopper 30, is permitted to pass through a gap, or feed opening, 68 into the feed trough 12. (See FIG. 4). The gap 68 is formed by the opening movement a pivotally hinged closure flap 70, the pivotal mounting being shown at 72. Upon being so introduced into the feed trough 12, the feed is carried around the entire system 10 by the paddles 64. After a predetermined length of time, the feed trough 12 will be substantially, operatively filled with the feed to a level 52, as aforementioned.

Referring to FIG. 4 and the closure flap 70 at the base of hopper 30, attention is invited to the provision of downwardly depending teeth 74, attached to the underside of the cover 70. Operationally, these teeth 74 are hit by paddles 64 during their passage, which serves to intermittently raise the cover 70 to a dotted position 70A, the raised position of the teeth being shown at 74A. This action creates an opening for the passage of feed 66 therethrough and into the feed trough 12. The enlarged opening, is shown at 68A.

In one specific preferred embodiment of the invention, the material forming the feed trough 12 consists of $\frac{1}{8}$" thick stainless steel material, as does the inverted U-shaped cover 32. The outer edges 18 of the feed trough 12 configuration of FIG. 2 are approximately $1\frac{1}{2}$" in length and, this in conjunction with the other dimensions, provides an appropriate and adequate feeding area 20. The drive chain 54 is of 3/16" dimensions and the paddles are affixed thereto by welding. The paddles 64 are welded to the chain about every fourth link, and the paddle dimension can be approximately $2'' \times 2'' \times \frac{1}{8}''$ in dimensions. Also in this specific embodiment, the drive motor 58 is adapted to provide an output rotation of approximately 30 RPM for a feed trough of 100 feet in total length. If a long feed trough 12 is used, an additional feed hopper 30A (not shown) may be advantageously added to the system 10. Alternately, the speed of drive motor 58 may be increased; both of these measures being directed to assure a timely distribution of the feed 66 to all feeding locations around the feeding system 10. The automatic timing mechanism 60 is comprised of two independently settable timers. A first 24 hour timer is set to energize the system 10 at two predetermined times of day, for a predetermined feeding duration each time. This is referred to as the TOD timer 60A. A second duty cycle timer is set to intermittently energize the system 10 during the predetermined feed duration. The intermittent action, as described above, is set illustratively at 2 active minutes out of every five minutes. This is referred to as the duty cycle (D.C.) timer 60B.

As previously pointed out, it is important that the gap 50 be of such a dimension that feed will be suitably metered out, and at the same time will permit a wet feed type to pass through the hopper and into the feed trough 12 for feeding purposes. In actual practice, it has been found that the paddles, as mounted and used, will push the feed under the adjustable top at the desired rate. Of course, adjustability is highly desirable, depending upon the feed used and feeding conditions involved.

It should be noted that this particular preferred embodiment does not utilize, nor does it require, any form of feed agitation, either mechanical or by feeding hogs in order to appropriately pass the feed material into the feed trough.

Although the invention has been described in terms of selected preferred embodiments, the invention should not be deemed limited thereto, since other embodiments and modifications will readily occur to one skilled in the art. It is therefore to be understood that the appended claims are intended to cover all such modifications as fall within the true spirit and scope of the invention.

What is claimed is:

1. Automatic animal feeding apparatus comprising: a horizontally disposed, extended feed trough having a planar bottom portion and upstanding side portions; an inverted U-shaped, open bottomed cover mounted above and coextensively with said trough; a plurality of paddles operatively mounted for movement through said trough and said cover to move feed therethrough; said cover being positioned relative to said trough as to provide a horizontal feed passage gas between the lower edges of said cover and the upper surface of said planar trough portion; said paddles coacting with said gap to controllably urge feed through said gap into said trough; and said cover being vertically adjustably mounted relative to said trough thereby providing predetermined gap vertical dimensions, and controlling the amount of feed urged therethrough.

2. Automatic hog feeding apparatus comprising: an extended planar feed trough adapted to retain feed for consumption therefrom; an inverted U-shaped, open bottomed cover mounted above said trough; a continuous chain operatively mounted for movement through said trough and positionally confined within said cover; paddles secured to spaced links of said chain and adapted to move feed along said trough upon movement of said chain, said cover positioned relative to said trough to provide a small gap between the lower edges of said cover and an upper surface of said planar trough; said paddles coacting with said gap to push feed through said gap into said trough for feeding access by hogs; said cover further being vertically adjustably mounted relative to said trough thereby providing predetermined gap vertical dimensions and controlling the amount of feed pushed therethrough; and L-shaped mounting brackets for said cover, the base of said brackets being adapted to adjustably rest upon an upper surface of said planar trough and the upwardly extended legs thereof adjustably affixed to said cover side walls, to thereby permit relative adjustment between the upper surface of said trough and the lowermost edges of the cover sides for variation of gap dimension.

3. Hog feeding apparatus of claim 2 wherein said L-shaped brackets are adapted to rest upon an upper surface of said planar trough and the upwardly extended legs thereof having an opening therethrough, the side walls of said cover having a plurality of vertically spaced holes therethrough, a nut and bolt combination adapted for passage through said hole in said bracket leg and, selectively, through said holes in said cover side walls, to thereby permit relative adjustment between the upper surface of said trough and the lowermost edges of the cover sides, for variation of gap dimension.

4. A hog feeding apparatus as claimed in claim 3, including a feed hopper operatively associated with, and above, said trough, said feed hopper having a pivotally mounted bottom cover thereon, operatively positioned above said trough, at least one tooth attached to said pivotally mounted cover and adapted for being engaged by said paddles upon movement of said chain and puddles through said trough to pivot said cover to a partially opened position to permit passage of grain through said hopper into said trough, and to substantially close said hopper between periods of engagement between said teeth and certain links of said chain.

5. A hog feeding apparatus as claimed in claim 4, said chain comprising a logging chain, said paddles being attached to spaced links of said logging chain, said chain and points of attachment of said paddles being contained and confined within said inverted cover for freedom from engagement with feed in the trough and by animals feeding from said trough.

6. A hog feeding apparatus as claimed in claim 5, said trough having a flat base portion and upwardly, angularly disposed lateral edges, the area between the side portions of said cover and the angularly disposed edges on said trough defining therebetween a feed consumption area.

7. A hog feeding apparatus as claimed in claim 6, said paddles being dimensioned to substantially contact the inner, upper surface of said trough for relative coaction therebetween, to move feed through said trough and thereby provide substantially the entire area of the trough for feeding access by animals and on laterally opposite sides thereof.

8. A hog feeding apparatus as claimed in claim 7, and further including motor means for driving said logging chain, rotationally disposed gears operatively supporting said chain.

9. A hog feeding apparatus as claimed in claim 8, and further including dual timer means selectively and periodically activating said drive motor for said chain, for selectively introducing feed into and movement through said trough.

* * * * *